Feb. 11, 1958 J. STRANGE 2,823,053
FASTENING ASSEMBLY AND CLIP
Filed Feb. 7, 1955
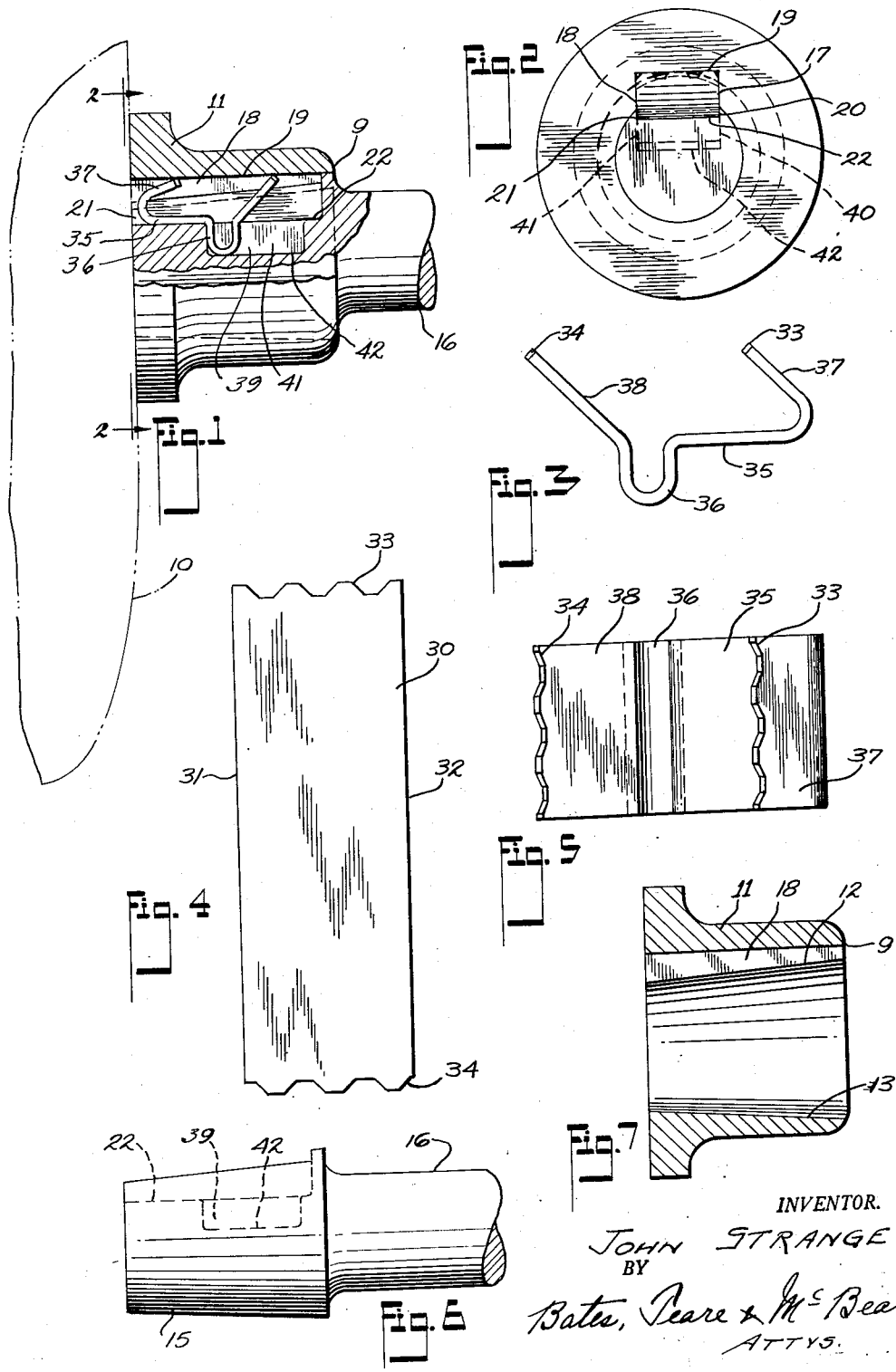
INVENTOR.
JOHN STRANGE
BY
Bates, Teare & McBean
ATTYS.

2,823,053

FASTENING ASSEMBLY AND CLIP

John Strange, Whitchurch, Cardiff, Wales, assignor to Tinnerman Products Inc., Cleveland, Ohio, a corporation of Ohio Application February 7, 1955, Serial No. 486,459

Claims priority, application Great Britain April 28, 1954

2 Claims. (Cl. 287—53)

This invention relates to fastening assemblies and also to a clip which is adapted for securing a handle to the side of a sauce-pan or other hollow-ware.

Considerable difficulty has been experienced in attaching a handle, particularly one made of plastic, to the socket of a hollow-ware article in such manner as to retain the handle against axial and rotational movement with respect to the article. Accordingly, it is an object of the present invention to make a fastening assembly by means of which a plug and socket member may be rigidly connected together, and by means of which the fastening assembly may be accomplished in a simple and expeditious manner.

Briefly, the present invention includes a pair of registering grooves in the handle and socket member, together with a yieldable clip which acts as a key between the registering grooves whenever the handle is inserted into the socket. Additionally, the invention includes a fastening clip having such formation that it will yield readily to admit the handle into the socket and will thereafter resist removal of the handle from the socket.

Referring now to the drawings,

Fig. 1 is an elevational view, partially in section, showing an assembly embodying the present invention;

Fig. 2 is an end elevation as viewed from the direction indicated by the lines 2—2 in Fig. 1;

Fig. 3 is a front elevation of the fastening clip;

Fig. 4 is a top plan view of a blank from which the clip is made;

Fig. 5 is a top plan view of the fastener when bent to the form shown in Fig. 3;

Fig. 6 is a front elevation of a portion of the handle removed from the assembly; and Fig. 7 is a vertical section taken longitudinally through the socket member.

In Fig. 1, I have shown in broken lines 10, an indicated outline of a portion of the side wall of a sauce-pan to which a socket member 11 is adapted to be permanently secured. The member 11, as shown in Fig. 7, has a tapered opening extending therethrough, as defined by the walls 12 and 13, which is adapted for receiving a correspondingly tapered plug 15 on the end of a handle 16.

To effect an interlocking connection between the handle and socket there are registering grooves extending longitudinally of the socket and plug respectively into which a key is adapted to be inserted. The groove in the socket is defined by the side walls 17 and 18 which extend into the body from the tapered wall 12 and by a top wall 19 which is disposed in the plane normal to the plane of the walls 17 and 18 and extends therebetween.

The groove in the handle plug which coacts with the groove in the socket is defined by the side walls 20 and 21 and by a bottom wall 22 which together define a groove extending inwardly from one end of the plug 15. The width of the groove in the plug conforms to that in the socket so that a key having uniform width can be disposed within the coacting grooves to effect a locking action between the plug and socket.

The locking key of the present invention is shown in the form of a spring clip which may be stamped from a blank 30 which has parallel longitudinally extending edges 31 and 32 and serrated end edges 33 and 34 respectively. In the preferred arrangement the clip is bent transversely to provide a base portion 35, a looped portion 36, a spring arm 37 and a longer spring arm 38. The looped portion 36 is adapted to be received in a recess 39 which extends inwardly toward the axis of the plug from the groove wall 22, and the recess is defined by side walls 40 and 41 and a bottom wall 42. The width of the recess corresponds to that of the aforesaid groove wherefore the clip may readily be inserted into the groove of the plug, with the looped portion 36 resting in the recess, prior to insertion of the latter into the socket.

In practice, the clip is inserted into the plug groove in such manner that the arm 37 is at the leading end of the plug while the plug is being inserted into the socket. The arm 37 has sufficient length to extend into the socket groove and to be bent downwardly toward the base portion 35 by a camming action against the edge 9 of the socket 11, whereby the arm is bent until the teeth 33 bear against the wall 19. Similarly, the arm 38 is sufficiently long and is so inclined with reference to the base portion 35 as to enter the groove within the socket and to be bent toward the axis of the plug during insertion until the teeth 34 engage the wall 19 of the socket groove. Thus, at the time of full insertion, the arms 37 and 38 are under tension, wherefore any force tending to withdraw the handle from the socket operates to effect a biting action between the teeth 33, 34 and the wall 19 to resist withdrawal of the plug.

To prevent rotation of the handle with reference to the socket, the width of the clip is approximately equal to the width of the grooves of the plug and socket respectively, wherefore the clip acts effectively as to key to prevent relative rotation of the handle with respect to the socket. At such time, the looped portion 36 acts as an abutment against a wall of the recess in the plug and coacts with the arms 37 and 38 to effect a biting engagement with the wall of the groove in the socket member.

The present invention is applicable for effecting an assembly wherein the handle may be formed either of metal or plastic material, and wherein the socket may be formed of either metal or plastic material. By utilizing a recess which is longer than the spread of the looped portion 36, the loop is allowed to open slightly as a result of the camming action against the arms 37 and 38 during the insertion of the handle into the socket.

The invention although described and illustrated in connection with the attachment of a handle to a receptacle is not limited to such use, but may be adapted for effecting an interlock between any two members which are fitted together by a movement axially of one member with respect to the other.

I claim:

1. A fastening assembly comprising a plug member and a socket member adapted to be fastened together against axial movement with respect to one another, said members having registering grooves therein, said plug member having a recess extending from the bottom wall of the groove therein, and a key carried by said plug member, said key comprising a shouldered portion projecting into said recess and being in abutting engagement with an end wall of said recess and yieldable arms projecting through the groove in said plug member and engaging in biting contact a confronting wall of the groove in said socket member, said engagements of said key with said walls operating to lock the members together against axial movement tending to withdraw one member from the other.

2. In combination, a first member having a tapered plug adjacent one end thereof and having a longitudinally extending peripheral groove therein, a second member having a hollow portion adapted to receive said plug, and having a groove extending longitudinally thereof and adapted to register with the first-named groove, said plug also having a recess extending from the bottom wall of the groove therein, a key having a shouldered portion projecting into the recess and having spring arms thereon projecting through the groove in the first member and into the groove in the second member, said arms resiliently engaging a wall of the groove in the second member and operating to permanently lock the members together against rotation with respect to each other, and against axial movement in one direction of one member with respect to the other.

References Cited in the file of this patent

UNITED STATES PATENTS

| | | |
|---|---|---|
| 2,180,929 | Murphy | Nov. 21, 1939 |
| 2,501,940 | Hibbard | Mar. 28, 1953 |
| 2,656,210 | Kump | Oct. 20, 1953 |
| 2,670,227 | Green | Feb. 23, 1954 |